United States Patent [19]
Kim

[11] Patent Number: 5,930,364
[45] Date of Patent: Jul. 27, 1999

[54] SYNCHRONIZED CHAOTIC SYSTEM AND COMMUNICATION SYSTEM USING SYNCHRONIZED CHAOTIC SYSTEM

[75] Inventor: Chil Min Kim, Ohjung-Dong Daejeon, Rep. of Korea

[73] Assignees: Daewoo Heavy Industries Ltd., Incheon; Chil Min Kim, Daejeon, both of Rep. of Korea

[21] Appl. No.: 08/834,821

[22] Filed: Mar. 31, 1997

[30] Foreign Application Priority Data

Mar. 29, 1996 [KR] Rep. of Korea .......................... 96-9357

[51] Int. Cl.$^6$ .................................................. H04L 9/00
[52] U.S. Cl. .................................................. 380/28; 380/48
[58] Field of Search .................................. 380/28, 46, 48

[56] References Cited

U.S. PATENT DOCUMENTS

| | | | |
|---|---|---|---|
| 5,245,660 | 9/1993 | Pecora et al. | 380/48 |
| 5,379,346 | 1/1995 | Pecora et al. | 380/48 |
| 5,432,697 | 7/1995 | Hayes | 380/46 |
| 5,680,462 | 10/1997 | Miller et al. | 380/28 |
| 5,857,025 | 1/1999 | Anderson et al. | 380/28 |
| 5,857,165 | 1/1999 | Corron et al. | 702/75 |

*Primary Examiner*—Salvatore Cangialosi
*Attorney, Agent, or Firm*—Staas & Halsey

[57] ABSTRACT

A synchronized chaotic system and a communication system using the synchronized chaotic system is disclosed. The synchronized chaotic system comprises a master chaotic part and a slave chaotic part, and a synchronizing part. The synchronizing part preforms operational functions to synchronize a chaotic signal output of the master chaotic part with a chaotic signal output of the slave chaotic part. The synchronizing part for preforming the operational functions includes a subtractor, scaler, and an adder. The output of the adder is is feedbacked to the slave chaotic part. The synchronization occurs when the synchronized system consisting of the variable differences of the master and the slave chaotic parts generates infinite period of laminar phase which is connected with on-off intermittency. Also, the synchronized chaotic system is applied to a communication system for encryption. The communication system comprises a transmitter including a master part for producing a chaotic signal and an adder for adding message signal to the chaotic signal, and a receiver including a slave part for producing a chaotic signal and a synchronizing part for synchronizing the chaotic signal of the master part with the chaotic signal of the slave part to retrieve the message signal.

6 Claims, 9 Drawing Sheets

SYNCHRONIZED CHAOTIC SYSTEM AND COMMUNICATION SYSTEM USING SYNCHRONIZED CHAOTIC SYSTEM

FIELD OF THE INVENTION

The present invention relates to a synchronized chaotic system for producing synchronized signals with an additional synchronizing apparatus which synchronizes chaotic signal output of a master chaotic part with chaotic signal output of at least one slave chaotic part and also relates to a communication system using the synchronized chaotic system.

Recently, a number of researches have been vigorously maded to apply "Chaos Theory" to various industrial fields. Since systems evloving chaotically display sensitivity to initial conditions, when two substantially identical chaotic systems start with slightly different initial conditions, two identical systems quickly evolve to values with different trajectories which are vastly different and become totally uncorrelated as time evolves. This makes chaotic systems nonperiodic and unpredictable over long times. The phenomenon is due to the sensitivity to initial conditions (This is called "Butterfly Effect"). In chaotic systems, the synchronization means that state variables of one chaotic system become identical to state variables of another chaotic system to control the chaotic phenomenon. However, such systems are impossible to synchronize by conventional methods. Thus, new numerous methods have been proposed and developed to synchronize signals of nonlinear dynamical systems and also to apply the synchronized chaotic system to secure communication.

Considering known prior arts, methods are described in papers by Louis M. Pecora and Thomas L Carroll entitled "Synchronization in Chaotic Systems" (PHYSICAL REVIEW LETTERS, Vol. 4 No. 8, p. 821, 1990) and entitled "Synchronizing Chaotic Circuits" (IEEE TRANSACTIONS CIRCUIT AND SYSTEMS, p. 453, April 1991). These articles disclose a theory of synchronizing two chaotic systems and describe a circuit demonstrating such synchronization. Also, U.S. Pat. No. 5,245,660 to Pecora and Carroll discloses a system for producing synchronized signal.

Figure 1:
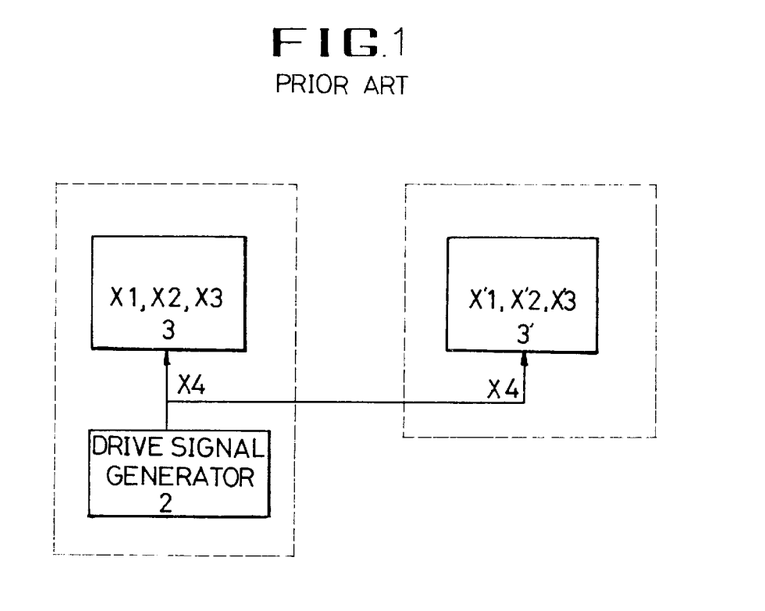
FIG. 1 is a block diagram illustrating synchronization concept according the prior art proposed by Pecora and Carroll.

FIG. 1 shows the synchronization concept disclosed in U.S. Pat. No. 5,245,660 to Pecora and Carroll. Referring to FIG. 1, the concept suggests as an application the linking of two systems, each with internal signals behaving chaotically, yet in synchronization. A primary system 1 as a master chaotic part is divided into first subsystem 2 as a drive signal generator and second subsystem 3. A new subsystem 3' identical to the subsystem 3 is linked with the primary system 1, there forming a response subsystem 1' as a slave chaotic part. The master and slave parts construct an overall chaotic system. The driving output signal X4 of the first subsystem 2 is transmitted to the second subsystem 3 and response subsystem 3' to synchronize the second subsystem 3 with the response subsystem 3' wherein the variables X1', X2', X3' of the response subsystem 3' correspond to the variables X1, X2, X3 of the second subsystem 3. As a result, the variables X1', X2', X3', X4' of the slave part 1' and the variables X1, X2, X3, X4 of the master part 1 are in synchronization with each other. In summary, U.S. Pat. No. 5,245,660 according to Pecora and Carroll suggests a synchronizing method wherein one variable of the slave part is substituted by one variable of the master part to synchronize the master chaotic part with the slave chaotic part.

On the other hand, synchronization in chaotic systems has high potentiality of pratical applications in secure communication, optics, and nonlinear dynamics model identification. In the secure communication field, numerous schemes have been proposed to make radio communications relatively immune to interference and secure from undesired listeners. Specially, the secure communication using a synchronizing system is disclosed in U.S. Pat. No. 5,291,555 to Cuomo and Oppenheim which employs the synchronizing concept of Pecora and Carroll thereto.

Figure 2:
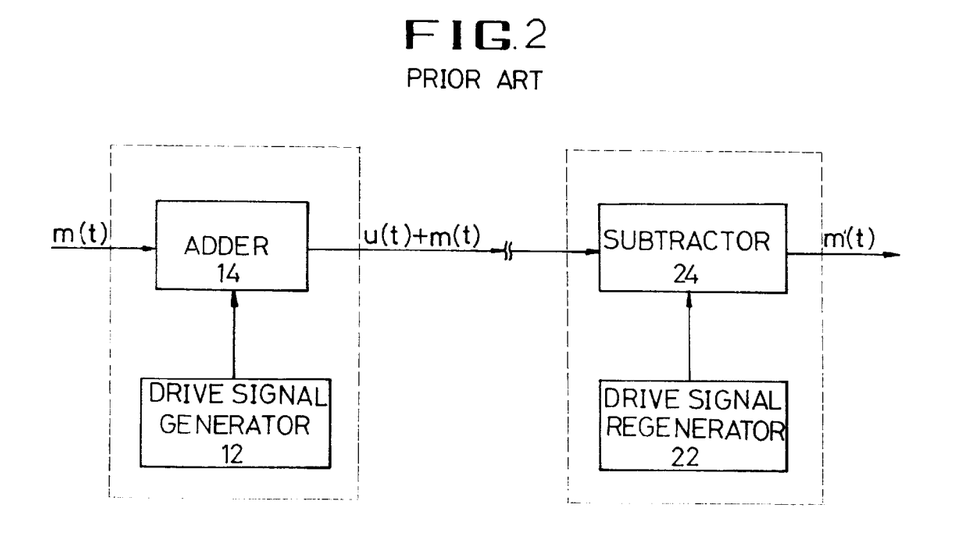
FIG. 2 is a block diagram of the communication system using the synchronized chaotic system according to the prior art.

FIG. 2 shows the communication system disclosed in U.S. Pat. No. 5,291,655 to Cuomo and Oppenheim. The communication system comprises a chaotic transmitter 10 including a drive signal generator 12 for producing a chaotic drive signal u(t) and an adder 14 for adding message signal m(t) to the drive signal u(t) to produce a transmitted signal, and a receiver 20 for receiving the transmitted signal including a drive signal regenerator 22 for reconstructing the drive signal u'(t) from the received signal u(t)+m(t), and a subtractor 24 for subtracting the reconstructed drive signal u'(t) from the received signal u(t)+m(t) to detect therefrom message signal m'(t).

However, the aforedescribed known prior art of Pecora and Carroll has the drawback that the overall chaotic system including the master and slave parts has a strong tendency to easy synchronization in spite of somewhat different parameters between the master and slave parts since the drive signal of the driving generator is without any conversion inputted into the response subsystem to synchronize two chaotic systems. Explaining it any other way, when the subsystem is satisfied with the synchronizing condition proposed by Pecora and Carroll that the Lyapunov exponents of the subsystem are all negative, the overall system may be easily synchronized even though the parameters of the circuit elements constructing the response system are variable to a certain degree, for example, 20 percentage. Thus, the prior art of Cuomo and Oppenheim employing the synchronizing concept of Pecora and Carroll also has the drawback that the transmitted message signal may be wiretapped since it is relatively easy to reproduce the communication apparatus on account of the strong synchronization tendency.

SUMMARY OF THE INVENTION

The present invention is directed to overcome the drawback as set forth above.

It is an object of the present invention to provide a synchronized chaotic system wherein a master part is synchronized with a slave part at strict conditions that the system consisting of the variable differences of the master part and the slave part generates infinite period of laminar phase which is connected with on-off intermittency.

It is anther object of the present invention to provide a synchronized chaotic system wherein the electronic circuit of the master part is identical to that of the slave part, thereby using a single type of an electronic circuit.

It is futher object of the present invention to provide a communication system using the synchronized chaotic system according to the present invention to achieve secure communication.

According to the present invention, these objects are achieved. There is provided a synchronized chaotic system comprising a master part for generating first chaotic signal output with chaotic characteristics, state variables of the master part being functionally interrelated; a slave part identical to the master part for generating second chaotic signal output with chaotic characteristics corresponding to the first chaotic signal output, state variables of the slave part being functionally interrelated; and means for receiving the first chaotic signal output and the second chaotic signal output, respectively and for subtracting the second chaotic signal output from the first chaotic signal output and for multipling the subtracted signal output by a scaling factor and for adding the second chaotic signal output to the signal output multiplied by the scaling factor, and for feedbacking the added signal output to the slave part to synchronize the first chaotic signal output with the second chaotic signal output.

Also, there is provided a communication system using a synchronized chaotic system comprising a transmitter including a master part for generating first chaotic signal output with chaotic characteristics, state variables of the master part being functionally interrelated and an adder for adding message signal input to the first chaotic signal output sent from the master part to produce masked signal; and a receiver including a slave part identical to the master part for generating second chaotic signal output with chaotic characteristics corresponding to the first chaotic signal output, state variables of the slave part being functionally interrelated, means for receiving the first chaotic signal output and the message signal transmitted from the transmitter, and the second chaotic signal output, respectively and for subtracting the second chaotic signal output from the first chaotic signal output and for multipling the subtracted signal output by a scaling factor and for adding the second chaotic signal output to the signal output multiplied by the scaling factor and for feedbacking the added signal output to the slave part to synchronize the first chaotic signal output with the second chaotic signal output, and for finally removing the first chaotic signal output and the second chaotic signal output synchronized to the first chaotic signal output to detect the message signal.

The various features of novelty which characterize the invention are pointed out with particularity in the claims annexed to and forming a part of this disclosure.

For a better understanding of the invention, its operating advantages and specific objects attained by its uses, reference is made to the accompaynying drawings and descriptive matter in which the preferred embodiments of the invention are illustrated.

DETAILED DESCRIPTION OF THE PREFERRED EMBODIES

This invention will be described in further detail by way of embodiments with reference to the accomanying drawings.

In general, mathematical models of chaotic systems often involve two types of systems, the systems of difference equations and the systems of the differential equations. The systems of the differential equations include well known Lorenz system, Ro"ssler system, Duffing system, and etc. The logistic map is well known as a system of the difference equation. The chaotic systems are fuinctionally defmed in terms of state variables which are used to construct a main electronic circuit in the chaotic system. Those skilled in the art can easily construct electronc circuits in correspondence to arbitrary chaotic systems defined in terms of the state variables. For example, the electronc circuit corresponding to well known Lorenz system is disclosed in U.S. Pat. No. 5,291,555. The electronc circuits corresponding to Ro"ssler and modified Duffing systems are disclosed in U.S. Pat. No. 5,402,334.

First of all, giving a kernel concept of the present invention, thle present invention is directed to a variable-mixing method to synchronize chaotic signals. The variable-mixing method includes the steps of transmitting one state variable of the master part to the slave part and adequately operating the transmitted state variable and the state variable of the slave part corresponding to the state variable of the master part, and feedbacking the operated output to the slave part, when the configuration of the master part is identical to that of the slave part. The variable-mixing method may be mainly used in well known nonlinear chaotic differential equations when perturbations are applied or not applied to the system from the external force.

Figure 3:
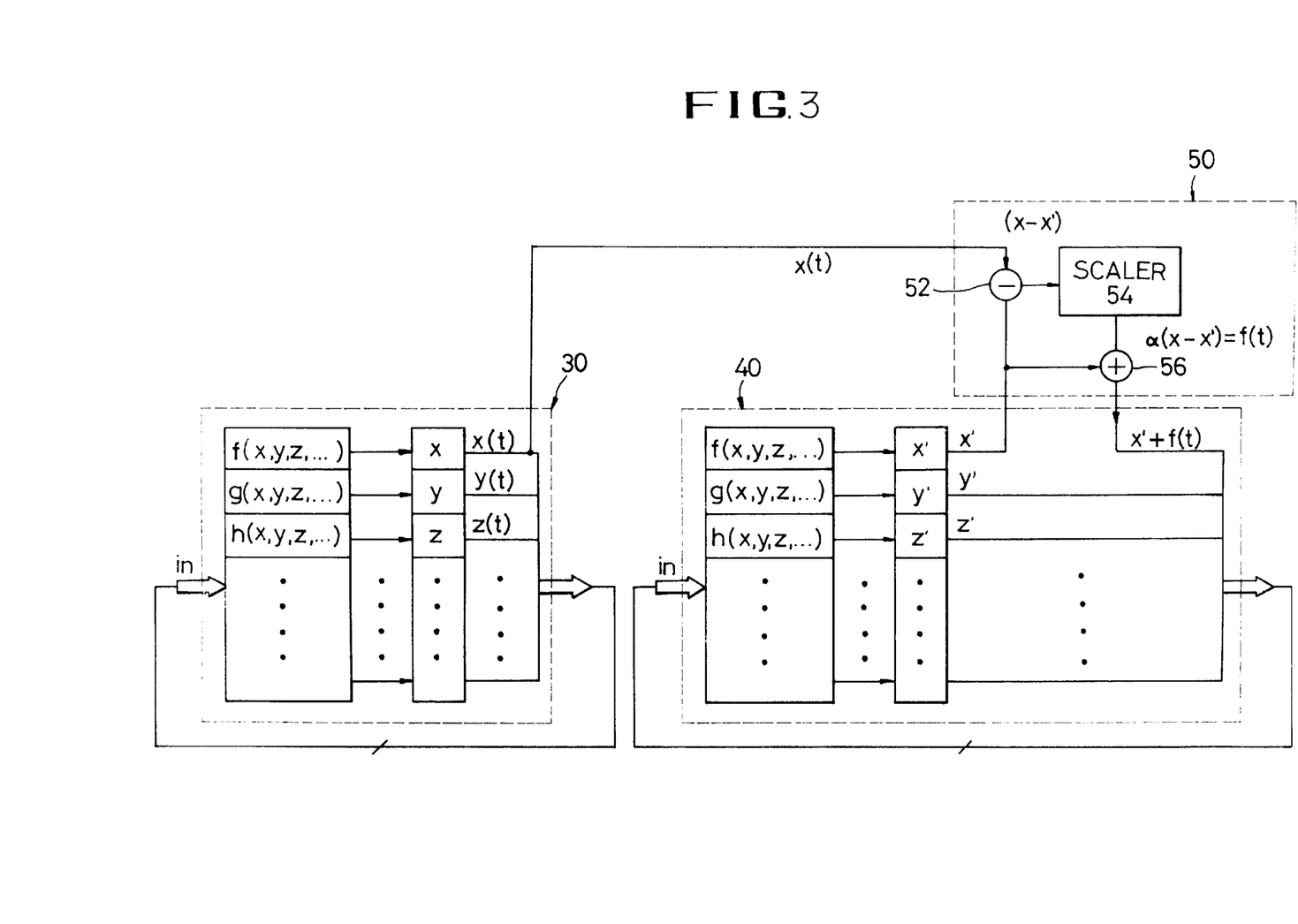
FIG. 3 is a schematic and operational diagram explaining synchronization concept according to the present invention.

Referring to FIG. 3, a master part 30 is given as n-dimensional state variables x(t), y(t), z(t), . . . and a slave part 40 identical to the master part 30 is given as n-dimensional state variables x'(t), y'(t), z'(t), . . . corresponding to the n-dimensional state variables x(t), y(t), z(t), . . . One state variable x(t) among a plurality of state variables of the master part 30 is transmitted to the slave part 40. A synchronizing part 50 is disposed between the master part 30 and the slave part 40 to synchronize the master and slave parts 30 and 40. The synchronizing part 50, which receives the state variable x(t) of the master part 30 and the state variable x'(t) of the slave part 40, respectively, includes a subtractor 52 for subtracting the state variable x'(t) from the state variable x(t) and a scaler 54 for multiplying the subtracted output x(t)−x'(t) by a scaling factor α, and an adder 56 for adding the state variable x'(t) of the slave part 40 to the output α(x(t)−x'(t))=f(t) multiplied by the scaling factor α and for feedbacking the added output x'(t)+f(t) to the slave part 40.

Since the initial conditions of the two identical chaotic parts 30 and 40 are not identical to each other, the master part 30 and the slave part 40 will have different trajectories as time evolves without the synchronizing part 50. According to the present invention, the master part 30 and the slave part 40 will have identical trajectories by means of the synchronizing part 50.

As described above, when the master part 30 is synchronized with the slave part 40 by the synchronizing part 50, x(t)=x'(t) and y(t)=y(t) and z(t)=z(t). That is, the state variables of the master part 30 becomes identical to those of the slave part 40. On the other hand, the feedbacked variable is x'(t)+f(t)=αx(t)+(1−α)x'(t), where f(t)=α(x(t)−x'(t)). Here, when α=1, the synchronizing method according to the present invention corresponds to the synchronizing method of Pecora and Carrol, and when α=0, the slave part 40 is independent of the master part 30. When α≠0, the slave part 40 is influenced by the master part 30. Accordingly, the synchronizing method according to the present invention is applied when α≠0.

Figure 4:
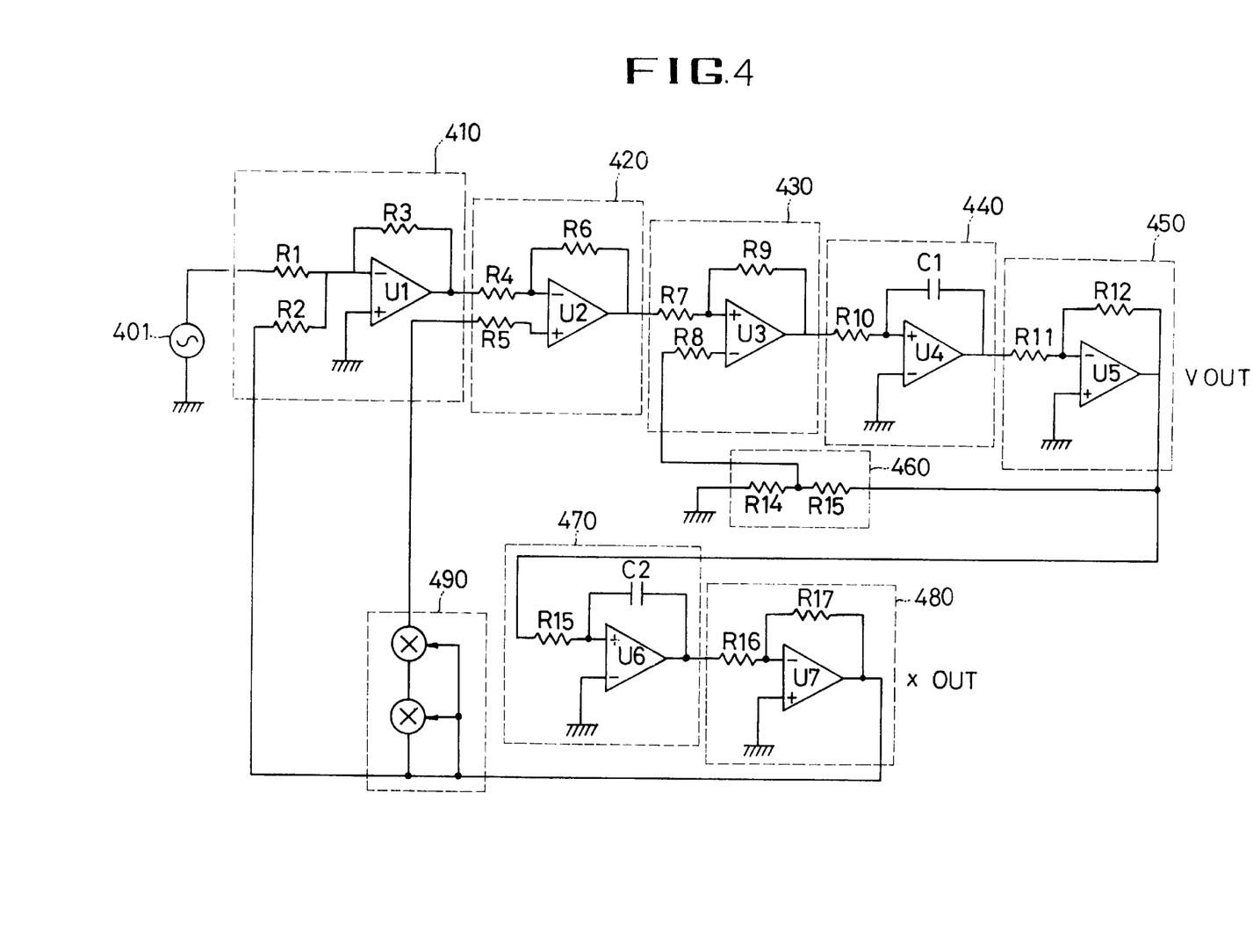
FIG. 4 is a circuit diagram of a chaotic system implementing Duffing equation adapted to apply the present invention.

Now, preferably, a Duffing equation which is defined as state variables x, V is considered for a practical application. The Duffing equation is given as $$\frac{dx}{dt} = V \tag{1}$$

$$\frac{dV}{dt} = -kV - x^3 + x + B\cos(\omega t)$$

where x and V are state variables, k is a parameter, B is the magnitude of the sine wave which is inputted from the external force, and ω is a frequency of the sine wave. From the Duffing equation, it is recognized that the chaos may be determined in accordance with the magnitude B and the frequency ω inputted from the external force. FIG. 4 shows a circuit diagram of a chaotic system implementing the Duffing equation. The circuit 400 of the Duffing chaotic system includes an oscillator 401 for generating a predetermined sine wave signal and perturbing the Duffing chaotic system, first adder 410 for adding a variable x and output Bcos(ωt) of the oscillator 401, first subtractor 420 for subtracting $x^3$ from the output of the first adder 410, second subtractor 430 for subtracting a scaled variable kV from the output of the first subtractor 420, first integrator 440 for integrating the output of the second subtractor 430, first inverting buffer 450 for inverting the output of the first integrator 440, a divider 460 for scaling the variable V of the first inverting buffer 450 and for outputting the scaled variable V to the second subtractor 430, second integrator 470 for integrating the output of the first inverting buffer 450, second inverting buffer 480 for inverting the output of the second integrator 470, and a multiplier 490 for multipling the output of the second inverting buffer 480 by a multipling factor of the multiplier 490. While those skilled in the art will readily understand the implementation shown in FIG. 4, further explanation is omitted hereinafter. For example, the amplifiers are conventional type LF353 operational amplifiers, resistors are conventional type 100 kohm precision resistors, capacitors are 0.01 microfarad capacitors. The multiplier may be MC1495L of Motolola. The divider 460 has dividing resistors R13 ana R14 in series wherein the resistor R13 is a 80 kohm dividing resistor, and the resistor R14 is a 20 kohm dividing resistor. Thus, the scaling factor becomes 0.2=20 kohm/(20 kohm+80 kohm).

The Duffing circuit shown in FIG. 4 may be used as the master and slave parts. The master and slave parts select variables x and x', respectively for synchronization from the variables x,V and x',V'.

Figure 5:
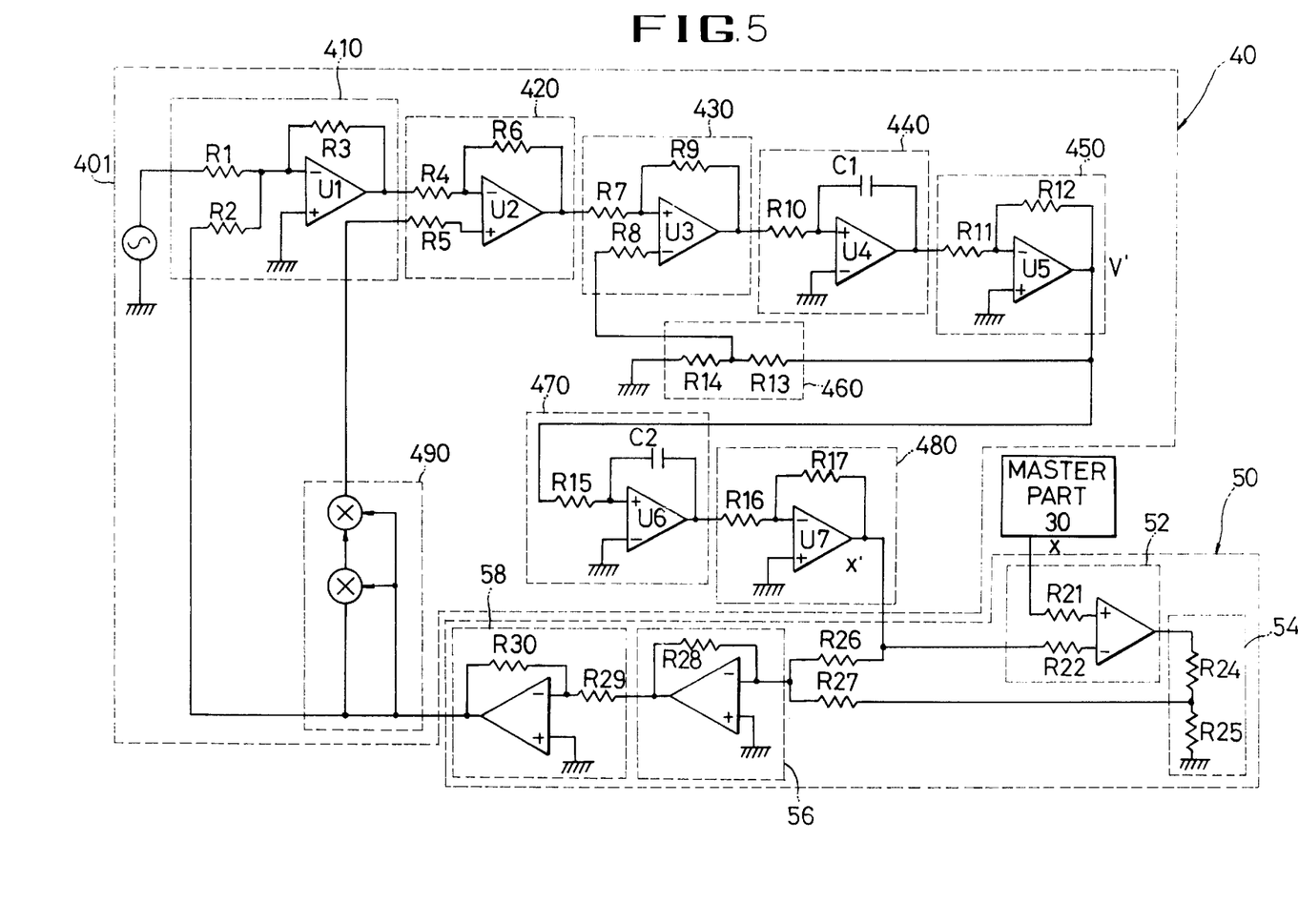
FIG. 5 is a circuit diagram showing an embodiment of a synchronized chaotic system according to the present invention.

Referring now to FIG. 5, a synchronizing chaotic system includes a master part 30 given as Duffing circuit, a slave part 40 identical to the master part 30, and a synchronizing part 50. The synchronizing part 50, which receives the state variable x(t) of the master part 30 and the state variable x'(t) of the slave part 40, respectively, includes a subtractor 52 for subtracting the state variable x'(t) from the state variable x(t) and a scaler 54 for multipling the subtracted output x(t)−x'(t) by a scaling factor α, and an adder 56 for adding the state variable x'(t) of the slave part 40 to the output α(x(t)−x'(t))= f(t) multiplied by the scaling factor α and an inverting buffer 58 for inverting the added output x'(t)+f(t) and for feedbacking the added output x'(t)+f(t) to the slave part 40. Here, the scaling factor α of the scaler 54 is determined by dividing resistors R24 and R26 in series wherein the resistor R24 is a 79 kohm dividing resistor, and the resistor R25 is a 21 kohm dividing resistor. Thus, the scaling factor becomes about 0.2.

Hereinafter, the operation of the preferred embodiment with the constitution as described above will be explained in detail.

Referring to eq. (1), since the Duffing equation of the slave part 40 is identical to that of the master part 30 but two parts 30 and 40 have different trajectories when the initial conditions of two identical chaotic parts 30 and 40 are different, in case that the Duffing equation of the master part 30 is given as the eq.(1), the Duffing equation of the slave part 40 is also given as $$\frac{dx'}{dt} = V' \tag{2}$$

$$\frac{dV'}{dt} = -kV' - x'^3 + x' + B\cos(\omega t)$$

where the master part 30 and the slave part 40 generate chaotic phnomenon when k=0.2, B=20.3, and ω=1.4.

Figure 8A:
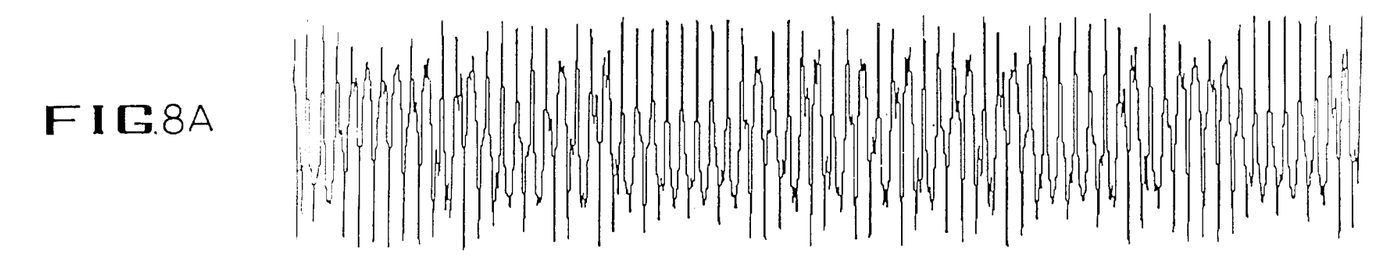
FIG. 8A and FIG. 8B show wave form charts of a master part and a slave part, respectively prior to the synchronization of the master part and the slave part.
Figure 8B:
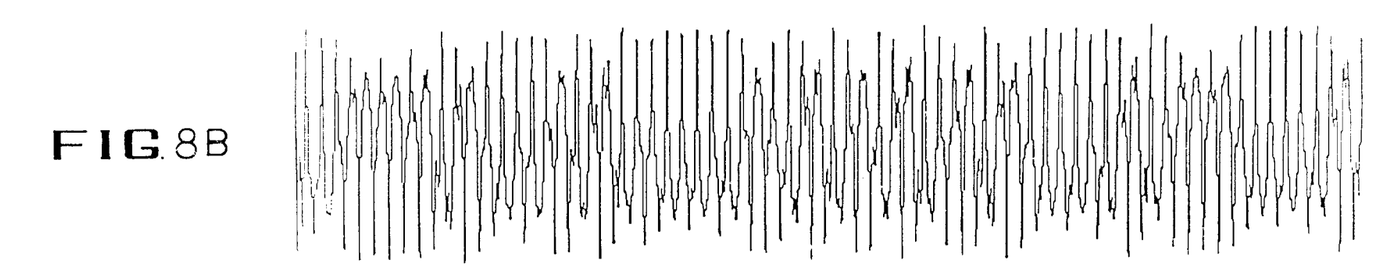

Referring to FIG. 8A and FIG. 8B, FIG. 8A shows a wave form chart of the master part 30 prior to the synchronization of the master part, and FIG. 8B shows a wave form chart of the slave part 40 prior to the synchronization of the slave part. From FIG. 8A and FIG. 8B, it is recognized that the master part and the slave part have different trajectories as time evolves and the master part is independent of the slave part since the initial conditions of the state variables x,V, and x',V' are differently set up. This phenomenon is due to the sensitivity to the initial conditions of the nonlinear chaotic parts.

However, according to the present invention, since the synchronizing part 50 for performing the above-described operations is disposed between the master part 30 and the slave part 40, finally, the trajectory of the master part 30 with the state variables x and V becomes identical to that of the slave part 40 with the state variables x' and V'. Namely, this means that the state variable x becomes the state variable x', and the state variable V becomes the state variable V'. In an intermidiate process, the Duffing equation of the slave part feedbacked by the synchronizing part 50 is substituted as $$\frac{dx'}{dt} = V' \tag{3}$$

$$\frac{dV'}{dt} = -kV' - (x' + f(t))^3 + (x' + f(t)) + B\cos(\omega t)$$

where f(t)=α(x(t)−x'(t)).

Now, to demonstrate the synchronization in an electronic circuit based on the Duffing equation, the meaning that the difference (x(t)−(x')) of two trajetroies becomes zero is explained.

If we let y=x-x' and w=V-V', then since $$\frac{dx}{dt} - \frac{dx'}{dt} = \frac{dy}{dt}, \frac{dV}{dt} - \frac{dV'}{dt} = \frac{dw}{dt}, \quad (4)$$

$$\frac{dw}{dt} = -kw - [x^3 - (x' + f(t))^3] + (x - x' - f(t))$$

Since f(t)=α(x-x') and y=x-x' in eq. (5), f(t)=αy and x'=x-y. Accordingly, applying the f(t)=αy and x'=x-y to eq. (4), then eq. (4) becomes $$\frac{dy}{dt} = w \quad (5)$$

$$\frac{dw}{dt} = -kw - (3x^2 - 1)(1-\alpha)y - 3x(1-\alpha)^2 y^2 + (1-\alpha)^3 y^3$$

Here it becomes obvious that the parameters are also modulated by x(t), $3x^2-1$ as the parameter of y, and 3x as the parameter of $y^2$. The eq. (5) governs a new nonlinear differential equation defined as a new chaotic system. In accordance to eq. (5), when the chaotic signal of the master part is sent to the new chaotic system, the master part itself maintains the original trajectory of the chaotic signal but the new chaotic system generates a new trajectory of the chaotic signal. On the other hand, the method of inverting parameters of the nonlinear system by the signal of the master part may be selected among well known methods. Therefore, the detailed descriptions thereof are omitted in here.

Analyzing the phenomena of the system in which the parameters are inverted in terms of the chaotic signal or noise signal, the system assumes very complicated phenomena. The inverted system irregularly oscillates from the chaotic signal to the value very close to zero, or converges to zero, or appears chaotic. The oscillation from the chaos to the value very close to zero is defined as on-off intermittency. There is a critical value condition that the system including the variable differences of a master part and a slave part generates infinite period of laminar phase which is connected with on-off intermittency. At a value above the critical value $\alpha_c$, the new chaotic system immediately converges to zero. Accordingly, the new chaotic system is synchronized with the master part since the differences between two identical variables become zero. That is, when α>$\alpha_c$, the system generates infinite period of laminar phase and the master part and the slave part are in synnchronization with each other.

The value of α can be experimentally obtained and the range of the value α is variable in accordance with characteristics of the system to be synchronized. Table 1 illustrates the phnomena according to the value α in the embodiment of the Duffing chaotic system.

Table 1 phenomena according to α in Duffing chaotic system

| range of α | phenomena of two chaotic systems |
| --- | --- |
| 1.0~0.93 | Pecora-Carrol synchronization |
| 0.92~0.29 | desynchronization |
| 0.28~0.26 | on-off intermittency |
| 0.25~0.19 | synchronization according to invention |
| 0.18~0.16 | on-off intermittency |

As illustrated in Table 1, in the Duffing chaotic system, when α=1.0~0.93, Pecora-Carrol synchronization occurs, and when α=0.92~0.29, two chaotic parts are desynchronized. When α=0.28~0.26, two chaotic parts are intermittently synchronized. When α=0.25~0.19, the syncronization of two chaotic system according to the present invention occurs. For α=0.18~0.16, on-off intermittency occurs again.

Comparing the results according to the present invention with the result of Pecora-Carrol synchronization, it is easily understood what the features of the present invention is. The result that Pecora-Carrol synchronization occurs when α=1 is to substitute the variable x' of the slave part by the the variable x of the master part. This Pecora-Carrol synchronization phenomenon is different from the synchronization phenomenon due to the critical value condition of on-off intermittency. Really, the synchronization according to the present invention occurs even if α≠1. This is due to the critical value condition of on-off intermittence. For example, when the value of α is close to 0.2(α=0.25~0.19 in Table 1) in Duffing equation, two chaotic parts of the master part and the slave part are synchronized. However, this value of α=0.2 considerably deviates from α=1 of the synchronization condition suggested by Pecora-Carrol, and, on the contrary, the synchronization scarcely occurs from the value α=0.3 to the value close to α=1. Accordingly, it is recognized that the synchronization of the present invention is basically different from that of the Pecora-Carrol.

While a Duffing-based system has been used in a preferred embodiment since the value of α and the range of α are distinct, it may also be possible to implement a chaotic system using a Lorenz-based system, Ro"ssler- based system, or a logistic map, etc.

Figures 9A, 9B:
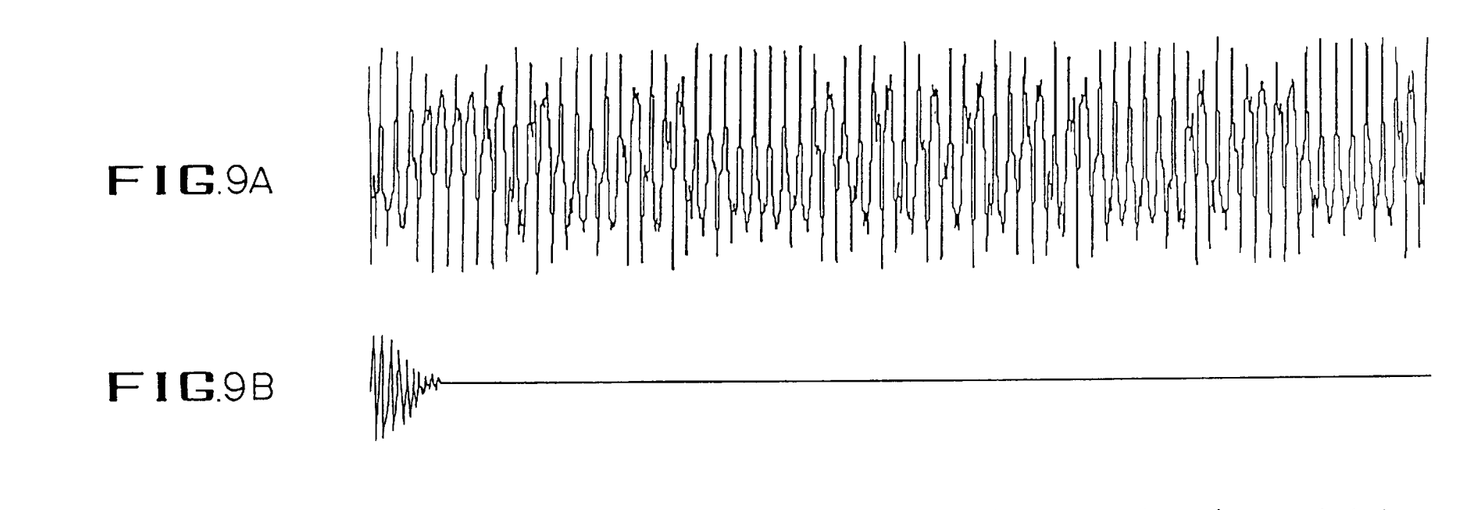
FIG. 9A to FIG. 9C show wave form charts with the result that the master part and the slave part are in synchronization with each other.
Figure 9C:
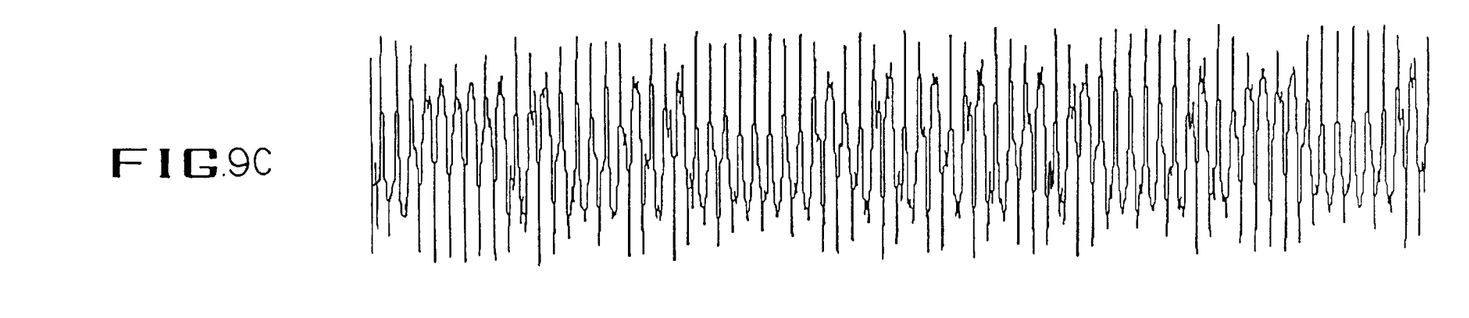

Referring to FIG. 9A to FIG. 9C, FIG. 9A to FIG. 9C illustrate the results that the master part 30 and the slave part 40 as shown in FIG. 5 are in synchronization with each other. FIG. 9A is a wave form chart of a trajectory of the master part 30 as time evolves and FIG. 9C is a wave form chart of a trajectory of the slave part 40 as time evolves, and FIG. 9B is a trajectory of enlarged variable difference x-x' between the variable x of the master part 30 and the variable x' of the slave part 40. Assessing the trajectories of the variables x and x', two chaotic parts 30 and 40 have different trajectories at the initial stage since two parts 30 and 40 have different initial conditions. Then, the synchronization begins. Finally, the state variables x of the master part 30 coincides with the state variable x' of the slave part 40 and two parts 30 and 40 have identical trajectories as a certain time evolves. FIG. 9B illustrates a process as mentioned right now.

Figure 6:
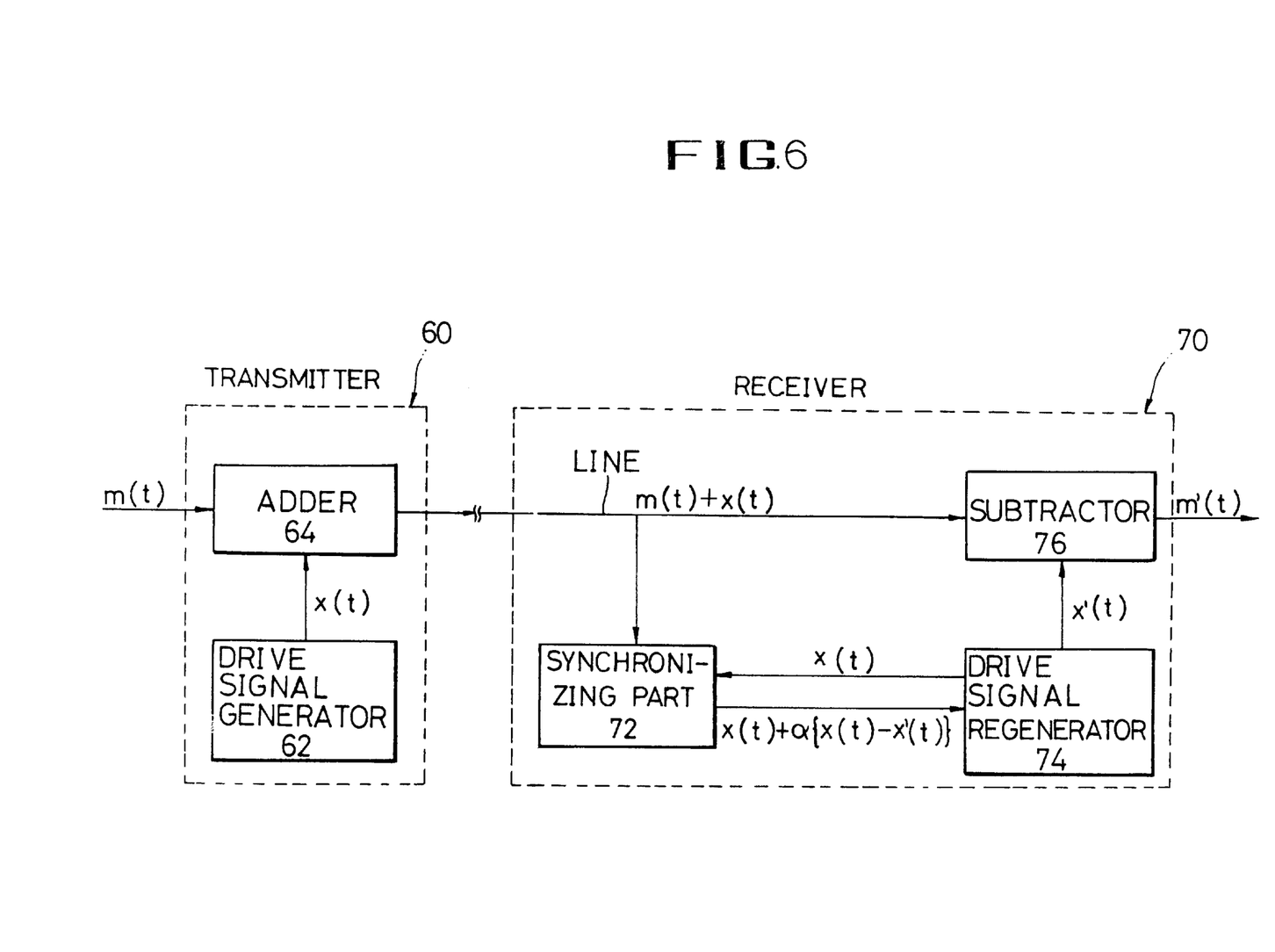
FIG. 6 is a block diagram illustrating a communication system with the synchronized chaotic system according to the present invention.

Hereinafter, as an application of the synchronized chaotic system according to the present invention, the linking of the two remote parts for secure communication will be explained in detail. Referring to FIG. 6, a communication system according to the present invention comprises a transmitter 60 which has a drive signal generator 62 and an adder 64, and a receiver 70 which has a synchronizing part 72, a drive signal regenerator 74, and a subtractor 76.

The drive signal generator 62 produces a chaotic signal x(t) and the adder 64 adds meassage signal m(t) and the chaotic signal x(t) to result in a masked signal x(t)+m(t) where the message signal m(t) is unrecognizable in the masked signal x(t)+m(t), and transmits the masked signal to the subtractor 76 of the receiver 70. Here, aural signals or digital data, etc. may be used as the message signal m(t). And, the adder 62 may be substituted by a modulator and the subtractor 76 may be substituted by a demodulator in accordance with the characteristics of the message signal and the transmission line.

The synchronizing part 74 of the receiver 70 receives the chaotic signal x(t) of the drive signal generator 62 and the chaotic signal x'(t) of the drive signal regenerator 74, respectively and substracts the chaotic signal x'(t) from the chaotic signal x(t) and multiplies the subtracted signal x(t)−x'(t) by a scaling factor α and adds the chaotic signal x'(t) to the output α(x(t)−x'(t)) multiplied by the scaling factor α, and feedbacks the added output x'(t)+α(x(t)−x'(t)) to the drive signal regenerator 74. The drive signal regenerator 74 has a chaotic circuit identical to the drive signal generator 62 and reproduces a chaotic signal x'(t) corresponding to the chaotic signal x(t) of the drive signal generator 62 and is gradually synchronized with the drive signal generator 62 by the signal x'(t)+α(x(t)−x'(t)) which is continuously feedbacked from the synchronizing part 72, thereby producing a chaotic signal x'=x identical to the signal x of the drive signal generator 62. The subtractor 76 substracts the chaotic signal x'(t) of the drive signal regenerator 74 from the chaotic signal x(t) of the drive signal generator 62 prior to the synchronization and finally removes the synchronized chaotic signal x'(t)=x(t) from the received chaotic signal or the masked signal x(t)+m(t) to detect the message signal m'(t).

As described above, the communication system according to the present invention uses the chaotic signal as a masked signal wherein the message signal m(t) may be combined with the chaotic signal x(t). Really, the transmitter transmits aural signal which is smaller than power spectrum of the chaotic signal and the receiver reconstructs the original aural signal by means of the additional synchronizing part. At this time, undesired listeners will not detect the information being transmitted and will detect only what appears to be noise or chaotic signal.

Figure 7:
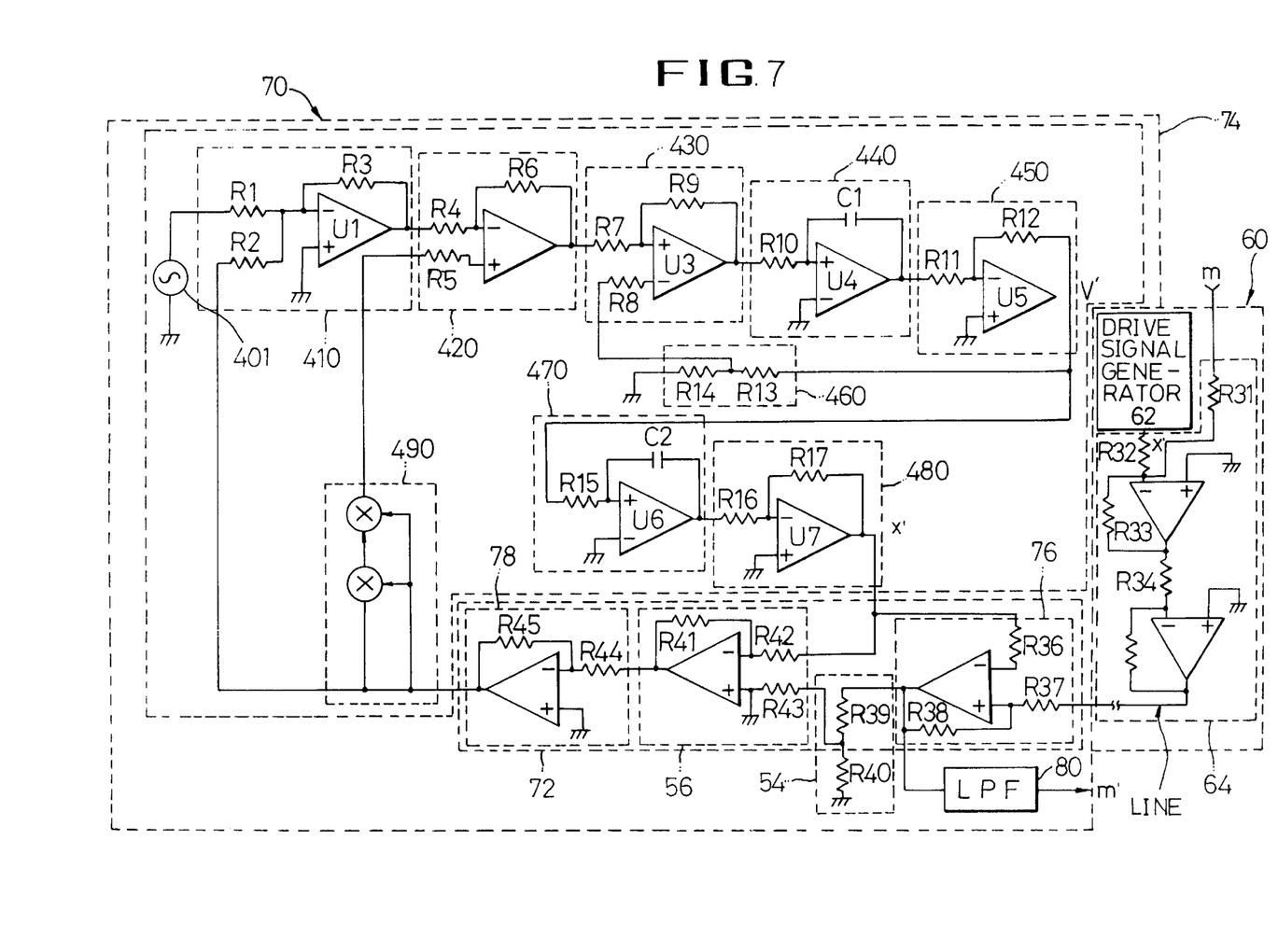
FIG. 7 is a circuit diagram showing an embodiment of the communication system.

Next, according to a preferred embodiment, the drive signal generator 62 and the drive signal regenerator 74 employ a Duffing circuit in the communication system using a synchronizing system. Referring to FIG. 7, the transmitter 60 includes a drive signal generator 62 for producing chaotic signal x(t) and an adder 64 for adding message signal m(t) to the chaotic signal x(t) to produce masked signal x(t)+m(t). The receiver 70 includes a drive signal regenerator 74 identical to the drive signal generator 62 for reproducing chaotic signal x'(t), and a synchronizing part 72 for synchronizing the receiver 70 with the transmitter 60 and for detecting the original message signal by subtracting the reproduced signal x'(t) from the received signal. All of wired or wireless transmission medium may be used in a transmission line connecting the transmitter 60 with the receiver 70, and a modulating-demodulating circuit may be additionally provided for the connection between the transmitter 60 and the receiver 70.

In circuit diagram as shown in FIG. 7, the drive signal generator 62 produces a chaotic signal x(t) and the drive signal regenerator 74 reproduces a chaotic signal x'(t). The adder 64 adds a message signal m(t) to the chaotic signal x(t) and transmits the masked signal x(t)+m(t) to the line via an inverting buffer. On the other hand, the synchronizing part 72 includes a subtractor 76, a scaler 54, an adder 56, and an inverting buffer 78. The subtractor 76 substracts the chaotic signal x'(t) of the drive signal regenerator 74 from the masked signal x(t)+m(t) and applies the subtracted signal (x(t)−x'(t))+m(t) to the scaler 54 and a low pass filter 80. Since the synchronized output of the subtractor 76 includes message signal m'(t), the low pass filter 80 detects the message signal m'(t). The scaler 64 has dividing resistors R39 and R40 to divide the output of the subtractor 76 and to mulitiply the output of the subtractor 76 by a scaling factor α. In this embodiment, the resistor R39 is a 79 kohm precision resistor and the resistor R40 is a 21 kohm precision resistor. Thus, the scaling factor α is about 0.2 corresponding to R40/(R39+R40). The adder 56 adds the chaotic signal x'(t) of the drive signal regenerator 74 to the scaled output α(x(t)−x'(t)) of the scaler 54 and applies the added output thereof to the drive signal regenerator 74 through the inverting buffer 78.

From now on, the operation of the communication system according to the present invention is explained.

When the drive signal generator 64 of the transmitter 60 produces a chaotic signal and transmits the chaotic signal to the receiver 70, the drive signal regenerator 74 of the receiver 70 is synchronized with the drive signal generator 64 by a feedbacked signal x'(t)+α(x(t)−x'(t)) inputted from the synchronizing part 72. After the synchronization, the transmitter 60 combines message signal m(t) with a chaotic signal x(t) and transmits the masked signal x(t)+m(t) to the receiver 70. Then, the receiver 60 substracts a synchronized chaotic signal x'(t) from the masked signal x(t)+m(t) and detects original message signal m'(t) through the low pass filter 80. In the communication system, the subtractor 76 performs not only the operation for subtracting the chaotic signal x'(t) from the masked signal x(t)+m(t) and but also the operation for detecting the message signal m'(t) from the masked signal x(t)+m(t).

Figure 10A:
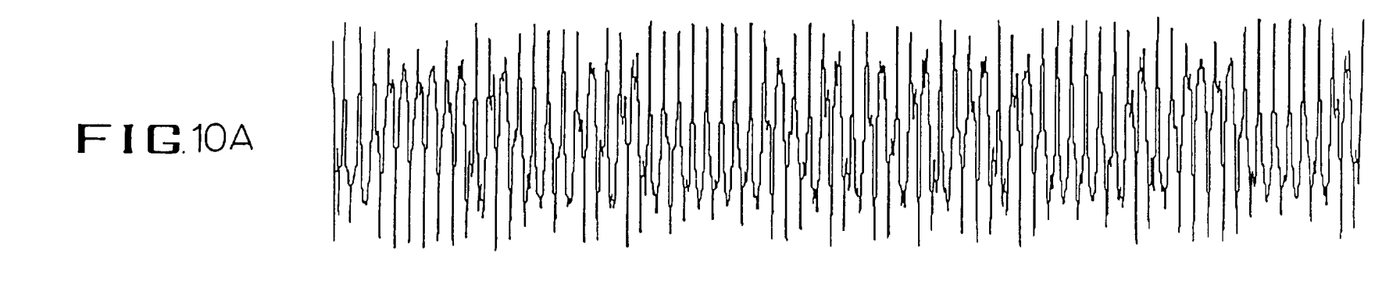
FIG. 10A to FIG. 10C show wave form charts of the communication system in accordance to the result that the master part and the slave part are synchronized each other.
Figure 10B:
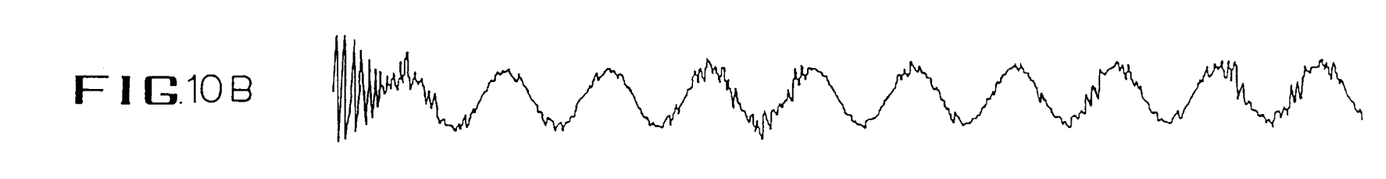
Figure 10C:
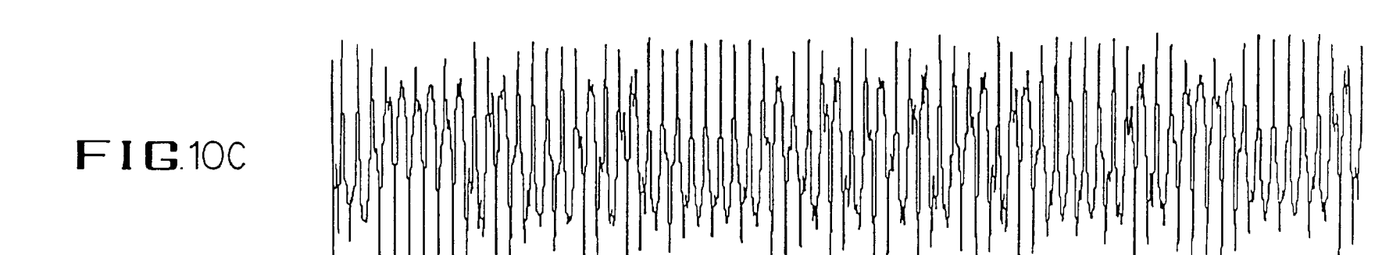

Referring to FIG. 10A to FIG. 10C, FIG. 10A to FIG. 10C illustrate computer simulation results in accordance with the communication system. FIG. 10A shows a masked signal x(t)+m(t) and FIG. 10C shows only chaotic signals x(t) and x'(t) of the transmitter and the receiver after synchronization, and FIG. 10B shows retrieved message signal m'(t) after the chaotic signal x'(t) shown in FIG. 10C is subtracted from the masked signal x(t)+m(t) shown in FIG. 10A. As shown in FIG. 10A to FIG. 10C, the transmitter 60 transmits a sine wave of message signal hidden in a chaotic signal, the sine wave itself is retrieved when α≈0.2. Here, comparing the wave forms shown in FIG. 10A to FIG. 10C with the wave forms shown in FIG. 9A to FIG. 9C, while the difference x(t)−x'(t) between two chaotic signals becomes zero, as shown in FIG. 9B, after the synchronization by the synchronizing system wherein the message signal m(t) is not combined with the chaotic signal x(t), the difference between the received masked signal x(t)+m(t) and the regenerated chaotic signal x'(t) becomes message signal m'(t), as shown in FIG. 10B, in the communication system using the synchronization system wherein the message signal m(t) is combined with the chaotic signal x(t).

Examining carefully the masked signal x(t)+m(t) shown in FIG. 10A and the chaotic signal x'(t) shown in FIG. 10C, it is recognized that there is no difference bwtween the signals x(t)+m(t) and x'(t). This is due to the relatively small difference therebetween. However, if the chaotic signal x'(t) is really subtracted from the masked signal x(t)+m(t), the message signal m'(t) can be retrieved as shown in FIG. 10B. As mentioned above, the original chaotic signal x(t) cannot be discriminated from the masked signal x(t)+m(t) since the message signal m(t) is hidden in the chaotic signal x(t). Accordingly, the present invention can be effectively applied to encryption methods. Since the synchronization of two chaotic parts according to the present invention is performed by variable-mixing method, the message signal being transmitted can be easily hiden in the chaotic signal. On the other hand, the present invention can be applicable not only to Duffing chaotic system forced from the external ,which is described above as a preferred embodiment, but to various chaotic systems including chaotic parts with the external force or without the external forces.

The invention is in no way limited to the embodiments described hereinabove. Various modifications of disclosed embodiments as well as other embodiments of the invention will become apparent to persons skilled in the art upon reference to the description of the invention. It is therefore contemplate that the appended claims will cover any such modification or embodiments as fall within the true scope of the invention.

What is claimed is:

1. A synchronized chaotic system comprising:

a master part for generating first chaotic signal output with chaotic characteristics, state variables of said master part being functionally interrelated;

a slave part identical to said master part for generating second chaotic signal output with chaotic characteristics corresponding to the first chaotic signal output, state variables of said slave part being functionally interrelated; and means for receiving the first chaotic signal output and the second chaotic signal output, respectively and for subtracting the second chaotic signal output from the first chaotic signal output and for multiplying the subtracted signal output by a scaling factor and for adding the second chaotic signal output to the signal output multiplied by the scaling factor, and for feedbacking the added signal output to said slave part to synchronize the first chaotic signal output with the second chaotic signal output.

2. A synchronized chaotic system as recited as claim 1, wherein said synchronizing means comprises a subtractor for subtracting the second chaotic signal output of said slave part from the first chaotic signal output of said master part, a scaler for scaling the output of the subtractor by the scaling factor, and an adder for adding the output of said slave part to the output of the scaler and for feedbacking the output of the adder to said slave part.

3. A synchronized chaotic system as recited as claim 2, wherein the scaling factor of said synchronizing means has a condition that the output difference of said master part and said slave part illustrates infinite period of laminar phase connected with on-off intermittency.

4. A communication system using a synchronized chaotic system comprising:

a transmitter including a master part for producing first chaotic signal output with chaotic characteristics, state variables of said master part being functionally interrelated and an adder for adding message signal input to the first chaotic signal output sent from the master part to produce masked signal; and a receiver including a slave part identical to the master part for reproducing second chaotic signal output with chaotic characteristics corresponding to the first chaotic signal output, state variables of said master part being functionally interrelated, and means for receiving the first chaotic signal output and the message signal transmitted from said transmitter, and the second chaotic signal output, respectively and for subtracting the second chaotic signal output from the first chaotic signal output and for multiplying the subtracted signal output by a scaling factor and for adding the second chaotic signal output to the signal output multiplied by the scaling factor and for feedbacking the added signal output to said slave part to synchronize the first chaotic signal output with the second chaotic signal output, and for finally removing the second synchronized chaotic signal output from the first chaotic signal output to detect the message signal.

5. A communication system using a synchronized chaotic system as recited as claim 4, wherein said synchronizing means comprises a subtractor for subtracting the second chaotic signal output of said slave part from the first chaotic signal output of said master part and for removing the first chaotic signal output and the second chaotic signal output synchronized to the first chaotic signal output to detect the message signal, a scaler for scaling the output of the subtractor by the scaling factor, and adder for adding the output of said slave part to the output of the scaler and feedbacking the output of the adder to said slave part.

6. A communication chaotic system as recited as claim 5, wherein the scaling factor of said synchronizing means has a condition that the output difference of said master part and said slave part illustrates infinite period of laminar phase connected with on-off intermittency.

* * * * *